United States Patent
Kaneko et al.

(10) Patent No.: US 10,343,906 B2
(45) Date of Patent: Jul. 9, 2019

(54) METHOD FOR PRODUCING DEUTERIUM-DEPLETED WATER, METHOD FOR SEPARATING HEAVY WATER AND LIGHT WATER, AND METHOD FOR PRODUCING DEUTERIUM-ENRICHED WATER

(71) Applicants: SHINSHU UNIVERSITY, Nagano (JP); KOTOBUKI TSUSHOU CO., LTD., Fukuoka (JP)

(72) Inventors: Katsumi Kaneko, Nagano (JP); Toshio Takagi, Fukuoka (JP); Katsuyuki Murata, Fukuoka (JP)

(73) Assignees: SHINSHU UNIVERSITY, Nagano (JP); KOTOBUKI TSUSHOU CO., LTD., Fukuoka (JP)

( * ) Notice: Subject to any disclaimer, the term of this patent is extended or adjusted under 35 U.S.C. 154(b) by 340 days.

(21) Appl. No.: 15/505,287

(22) PCT Filed: Aug. 27, 2015

(86) PCT No.: PCT/JP2015/074154
§ 371 (c)(1),
(2) Date: Feb. 21, 2017

(87) PCT Pub. No.: WO2016/031896
PCT Pub. Date: Mar. 3, 2016

(65) Prior Publication Data
US 2017/0253482 A1 Sep. 7, 2017

(30) Foreign Application Priority Data
Aug. 29, 2014 (JP) .................................. 2014-175354

(51) Int. Cl.
*B01D 53/02* (2006.01)
*C01B 5/02* (2006.01)
(Continued)

(52) U.S. Cl.
CPC .............. *C01B 5/02* (2013.01); *B01D 53/047* (2013.01); *B01D 53/0476* (2013.01);
(Continued)

(58) Field of Classification Search
CPC ........ B01D 2253/102; B01D 2253/108; B01D 2257/80; B01D 53/047; B01D 53/0476;
(Continued)

(56) References Cited

U.S. PATENT DOCUMENTS 3,399,967 A * 9/1968 Pogorski ................... C01B 5/02
423/580.1
3,698,156 A * 10/1972 Dirian .................... B01D 59/26
95/86
(Continued)

FOREIGN PATENT DOCUMENTS

| CN | 1834002 | 9/2006 |
| CN | 103803494 | 5/2014 |

(Continued)

OTHER PUBLICATIONS

English Translation of the International Search Report issued by the Japan Patent Office regarding International Application No. PCT/JP2015/074154, dated Nov. 17, 2015, 1 page.
(Continued)

*Primary Examiner* — Christopher P Jones
(74) *Attorney, Agent, or Firm* — Haynes and Boone, LLP

(57) ABSTRACT

Deuterium-depleted water is produced easily and inexpensively. A method for producing deuterium-depleted water by removing heavy water and semi-heavy water from water includes an adsorption step of supplying water vapor to a predetermined adsorbent at pressure at which heavy water and semi-heavy water are adsorbed by the adsorbent and light water is not easily adsorbed, causing the heavy water and semi-heavy water to be adsorbed, and recovering the
(Continued)

water vapor not adsorbed by the adsorbent. The method also includes a desorption step of maintaining vapor pressure around the predetermined adsorbent which has adsorbed the water vapor in a range in which light water is desorbed and heavy water or semi-heavy water is not easily desorbed, and recovering the water vapor desorbed from the adsorbent.

12 Claims, 5 Drawing Sheets

(51) Int. Cl.
 *B01D 53/047* (2006.01)
 *B01D 59/26* (2006.01)
 *B01J 20/20* (2006.01)
 *C01B 5/00* (2006.01)

(52) U.S. Cl.
 CPC .............. *B01D 59/26* (2013.01); *B01J 20/20* (2013.01); *C01B 5/00* (2013.01); *B01D 2253/102* (2013.01); *B01D 2253/108* (2013.01); *B01D 2257/80* (2013.01)

(58) Field of Classification Search
 CPC ........ B01D 2259/26; B01J 20/20; C01B 5/00; C01B 5/02
 See application file for complete search history.

(56) References Cited

U.S. PATENT DOCUMENTS

| 3,700,417 | A | * | 10/1972 | Broughton | ......... | B01D 15/1821 |
| | | | | | | 210/689 |
| 5,441,715 | A | * | 8/1995 | Gamo | .................... | B01D 59/26 |
| | | | | | | 423/249 |
| 7,659,430 | B2 | | 2/2010 | Woelfert et al. | | |
| 2012/0042688 | A1 | * | 2/2012 | Avery | ................. | B01D 53/261 |
| | | | | | | 62/532 |
| 2012/0097532 | A1 | * | 4/2012 | DeLuze | ................. | G21B 3/006 |
| | | | | | | 204/278 |
| 2017/0165590 | A1 | * | 6/2017 | Nakamura | ............. | B01D 59/08 |
| 2018/0111090 | A1 | * | 4/2018 | Kaneko | ................. | B01D 59/26 |

FOREIGN PATENT DOCUMENTS

| DE | 2434876 | 4/1975 |
| EP | 3278864 | 2/2018 |
| JP | 53-034098 A | 3/1978 |
| JP | 05-131331 A | 2/1993 |
| JP | 10-128072 A | 5/1998 |
| JP | 2012-158499 A | 8/2012 |
| KR | 100736020 | 6/2007 |

OTHER PUBLICATIONS

Written Opinion issued by the Japan Patent Office regarding International Application No. PCT/JP2015/074154,datedNov. 17, 2015, 7 pages.
International Preliminary Examination Report issued by the Japan Patent Office regarding International Application No. PCT/JP2015/074154,dated Aug. 1, 2016, 11 pages.
Xiao-Zhong, Dynamic experiments and model of hydrogen and deuterium separation with micropore molecular sieve Y at 77K, Chemical Engineering Journal, 2009, vol. 152, p. 428-433).
Fitzgerald, Highly Selective Quantum Sieving of D2 from H2 by a Metal-Organic Framework as Determined by Gas Manometry and Infrared Spectroscopy, J. Am. Chem. Soc., 2013, vol. 135, p. 9458-9464.
Office Action in Chinese Patent Application No. 201580044099.8, dated Oct. 31, 2018.
Office Action in Taiwan Patent Application No. 104127130, filed Jun. 22, 2018.
Yasunori Iwai et al., "Application of Pressure Swing Adsorption to Water Detritiation Process," Journal of Nuclear Science and Technology, vol. 42, No. 6, Jun. 2005, pp. 566-572.
International Preliminary Report on Patentability issued in WO Patent Application No. PCT/JP2015/074154, dated Mar. 2, 2017, 6 pgs.
Search Report issued in EP Patent Application No. 15835066.0, dated Mar. 6, 2018.
Notice of Allowance in Taiwan Patent Application No. 107132073, dated Jan. 9, 2019.

* cited by examiner

METHOD FOR PRODUCING DEUTERIUM-DEPLETED WATER, METHOD FOR SEPARATING HEAVY WATER AND LIGHT WATER, AND METHOD FOR PRODUCING DEUTERIUM-ENRICHED WATER

CROSS REFERENCE

This application is a United States national phase application of co-pending international patent application number PCT/JP2015/074154, filed Aug. 27, 2015, which claims priority to Japanese patent application number 2014-175354, filed Aug. 29, 2014, the entire disclosures of which are hereby incorporated herein by reference.

TECHNICAL FIELD

The present invention relates to a method for producing deuterium-depleted water obtained by reducing the amount of heavy water or semi-heavy water from general water.

The present invention also relates to a method for separating heavy water and semi-heavy water from light water, and a method for producing deuterium-enriched water containing a large amount of heavy water and semi-heavy water.

BACKGROUND ART

General water includes H2O (light water) together with D2O (heavy water) or DHO (semi-heavy water) which is a water molecule containing a deuterium atom as an isotope of a hydrogen atom. The concentration of heavy water and semi-heavy water contained in water existing in nature is approximately 150 ppm on a flat area, although depending on a sampling location, and most thereof is semi-heavy water.

The amount of heavy water and semi-heavy water contained in a human body is, for example, as small as 95 ppm of a body weight in a case of an adult having a body weight of 60 kg.

However, heavy water or semi-heavy water has physical properties such as a solubility for a substance, an electrical conductivity, and an ionization degree, and a reaction rate different from light water. Therefore, when a large amount of heavy water or semi-heavy water is taken, a disorder is caused in a living body, and a living thing dies in pure heavy water. Therefore, it is said that a lower deuterium concentration in drinking water or the like is more desirable for health of a human body, and verification has been developed.

Deuterium-depleted water containing little heavy water or semi-heavy water is not authorized by the Ministry of Health, Labour and Welfare in Japan, but is authorized as an anti-cancer agent for animals in Hungary, and is often taken by a cancer patient or the like.

As a method for producing deuterium-depleted water from general water, deuterium-depleted water has been conventionally produced by a method for repeating distillation utilizing a very small difference in physical properties between hydrogen and deuterium (Patent Literature 1) or a water electrolysis method (Patent Literature 2).

However, the conventional method for producing deuterium-depleted water requires large equipment and repeated complicated work, and has high production cost thereof. Therefore, a cancer patient or a person who wants to drink deuterium-depleted water expecting various effects has a large economic burden.

CITATION LIST

Patent Literature

Patent Literature 1: JP 2008-512338 A
Patent Literature 2: JP 2012-158499 A

SUMMARY OF INVENTION

Technical Problem

The present invention has been achieved in order to solve the above problems, and an object thereof is to produce deuterium-depleted water easily and inexpensively.

Another object of the present invention is to produce deuterium-enriched water containing a large amount of heavy water and semi-heavy water easily and inexpensively.

Solution to Problem

In the present invention, a means for solving the above problems is as follows.

A first invention is a method for producing deuterium-depleted water by removing heavy water and semi-heavy water from water, characterized by including an adsorption step of supplying water vapor to a predetermined adsorbent at pressure at which heavy water and semi-heavy water are adsorbed by the adsorbent and light water is not easily adsorbed, causing the heavy water and the semi-heavy water to be adsorbed, and recovering the water vapor not adsorbed by the adsorbent.

The above method can be used also for recovering and utilizing water containing a large amount of heavy water or semi-heavy water.

A second invention is a method for producing deuterium-depleted water by removing heavy water and semi-heavy water from water, characterized by including a desorption step of maintaining air pressure around a predetermined adsorbent which has adsorbed water vapor in a range in which light water is desorbed and heavy water or semi-heavy water is not easily desorbed, and recovering the water vapor desorbed from the adsorbent.

The above method can be used also for recovering and utilizing water containing a large amount of heavy water or semi-heavy water.

A third invention is a method for producing deuterium-depleted water by removing heavy water and semi-heavy water from water, characterized by including at least one step of supplying water vapor to a predetermined adsorbent for adsorption, and at least one desorption step of maintaining air pressure around the adsorbent in a range in which light water is desorbed and heavy water or semi-heavy water is not easily desorbed, and recovering the water vapor desorbed from the adsorbent.

The above method can be used also for recovering and utilizing water containing a large amount of heavy water or semi-heavy water.

A fourth invention is a method for producing deuterium-depleted water by removing heavy water and semi-heavy water from water, characterized by including at least one first step of maintaining air pressure around a predetermined first adsorbent which has adsorbed water vapor in a first adsorption tank in a range in which light water is desorbed and heavy water or semi-heavy water is not easily desorbed, recovering the water vapor desorbed from the first adsorbent, and supplying the water vapor recovered in the first adsorption tank to a predetermined second adsorbent in a second adsorption tank for adsorption, and at least one second step of maintaining air pressure around the second adsorbent which has adsorbed the water vapor in the second adsorption tank in a range in which light water is desorbed and heavy water or semi-heavy water is not easily desorbed, recovering the water vapor desorbed from the second adsorbent, and supplying the water vapor recovered in the second adsorption tank to the first adsorbent in the first adsorption tank for adsorption.

The above method can be used also for recovering and utilizing water containing a large amount of heavy water or semi-heavy water.

A fifth invention is characterized in that the adsorbent is formed of a material classified into type IV or V in the IUPAC classification for a water vapor adsorption isotherm.

A sixth invention is a method for separating water into light water, and heavy water and semi-heavy water, characterized in that water vapor is supplied to a predetermined adsorbent at pressure at which heavy water and semi-heavy water are adsorbed by the adsorbent and light water is not easily adsorbed, and the heavy water and the semi-heavy water are caused to be adsorbed.

A seventh invention is a method for separating water into light water, and heavy water and semi-heavy water, characterized in that air pressure around a predetermined adsorbent which has adsorbed water vapor is maintained in a range in which light water is desorbed and heavy water or semi-heavy water is not easily desorbed, and the water vapor is desorbed from the adsorbent.

An eighth invention is a method for producing deuterium-enriched water by removing light water from water, characterized by including an adsorption step of supplying water vapor to a predetermined adsorbent at pressure at which heavy water and semi-heavy water are adsorbed by the adsorbent and light water is not easily adsorbed, causing the heavy water and the semi-heavy water to be adsorbed, and recovering the water adsorbed by the adsorbent.

A ninth invention is a method for producing deuterium-enriched water by removing light water from water, characterized in that after a desorption step of maintaining air pressure around a predetermined adsorbent which has adsorbed water vapor in a range in which light water is desorbed and heavy water or semi-heavy water is not easily desorbed, and desorbing the water vapor from the adsorbent, water remaining in the adsorbent is recovered.

Advantageous Effects of Invention

According to the first invention, by including an adsorption step of supplying water vapor to a predetermined adsorbent at pressure at which heavy water and semi-heavy water are adsorbed by the adsorbent and light water is not easily adsorbed, causing the heavy water and the semi-heavy water to be adsorbed, and recovering the water vapor not adsorbed by the adsorbent, deuterium-depleted water can be produced inexpensively and easily with a simpler apparatus than prior art.

Water remaining in the adsorbent contains a large amount of concentrated heavy water or semi-heavy water, and therefore can be utilized.

According to the second invention, by including a desorption step of maintaining air pressure around a predetermined adsorbent which has adsorbed water vapor in a range in which light water is desorbed and heavy water or semi-heavy water is not easily desorbed, and recovering the water vapor desorbed from the adsorbent, deuterium-depleted water can be produced inexpensively and easily with a simpler apparatus than prior art.

Water remaining in the adsorbent contains a large amount of concentrated heavy water or semi-heavy water, and therefore can be utilized.

According to the third invention, by including at least one step of supplying water vapor to a predetermined adsorbent for adsorption, and at least one desorption step of maintaining air pressure around the adsorbent in a range in which light water is desorbed and heavy water or semi-heavy water is not easily desorbed, and recovering the water vapor desorbed from the adsorbent, heavy water and semi-heavy water can be caused to be adsorbed by the adsorbent efficiently, and deuterium-depleted water can be produced inexpensively and easily.

Water remaining in the adsorbent contains a large amount of concentrated heavy water or semi-heavy water, and therefore can be utilized.

According to the fourth invention, by performing a desorption step in one of a first adsorption tank and a second adsorption tank and performing adsorption of the water vapor in the other tank simultaneously, heavy water and semi-heavy water can be adsorbed by a first adsorbent and a second adsorbent extremely efficiently, and deuterium-depleted water can be produced inexpensively and easily.

Water remaining in the first adsorbent and the second adsorbent contains a large amount of concentrated heavy water or semi-heavy water, and therefore can be utilized.

According to the fifth invention, by forming the adsorbent of a material classified into type IV or V in the IUPAC classification for a water vapor adsorption isotherm, heavy water and semi-heavy water can be separated easily, and deuterium-depleted water can be produced.

According to the sixth invention, by supplying water vapor to a predetermined adsorbent at pressure at which heavy water and semi-heavy water are adsorbed by the adsorbent and light water is not easily adsorbed, and causing the heavy water and the semi-heavy water to be adsorbed, heavy water and semi-heavy water can be separated from light water inexpensively and easily with a simpler apparatus than prior art.

According to the seventh invention, by maintaining air pressure around a predetermined adsorbent which has adsorbed water vapor in a range in which light water is desorbed and heavy water or semi-heavy water is not easily desorbed, and desorbing the water vapor from the adsorbent, heavy water and semi-heavy water can be separated from light water inexpensively and easily with a simpler apparatus than prior art.

According to the eighth invention, by including an adsorption step of supplying water vapor to a predetermined adsorbent at pressure at which heavy water and semi-heavy water are adsorbed by the adsorbent and light water is not easily adsorbed, causing the heavy water and the semi-heavy water to be adsorbed, and recovering the water adsorbed by the adsorbent, deuterium-enriched water can be produced inexpensively and easily with a simpler apparatus than prior art.

According to the ninth invention, after a desorption step of maintaining air pressure around a predetermined adsorbent which has adsorbed water vapor in a range in which light water is desorbed and heavy water or semi-heavy water is not easily desorbed, and desorbing the water vapor from the adsorbent, water remaining in the adsorbent is recovered, and deuterium-enriched water can be thereby produced inexpensively and easily with a simpler apparatus than prior art.

DESCRIPTION OF EMBODIMENTS

Hereinafter, a method for producing deuterium-depleted water according to embodiments of the present invention will be described.

The present invention utilizes a fact that heavy water or semi-heavy water is adsorbed by a predetermined adsorbent more easily and is harder to be desorbed therefrom than light water.

As an adsorbent, a material classified into type IV or V in the IUPAC adsorption isotherm classification with respect to water vapor is preferably used. This is because the adsorption amount in the material of type IV or V is changed largely by a small change in pressure.

Examples of such a material include a carbon adsorbent such as activated carbon, activated carbon fiber, or carbon nanotube, and an inorganic porous body such as silica gel or zeolite.

Among these materials, an AlPO zeolite material such as AQSOA (registered trademark) or ALPO-5 has excellent adsorption performance, and activated carbon is inexpensive.

Hereinafter, description will be made based on an example using activated carbon as an adsorbent.

Figure 1:
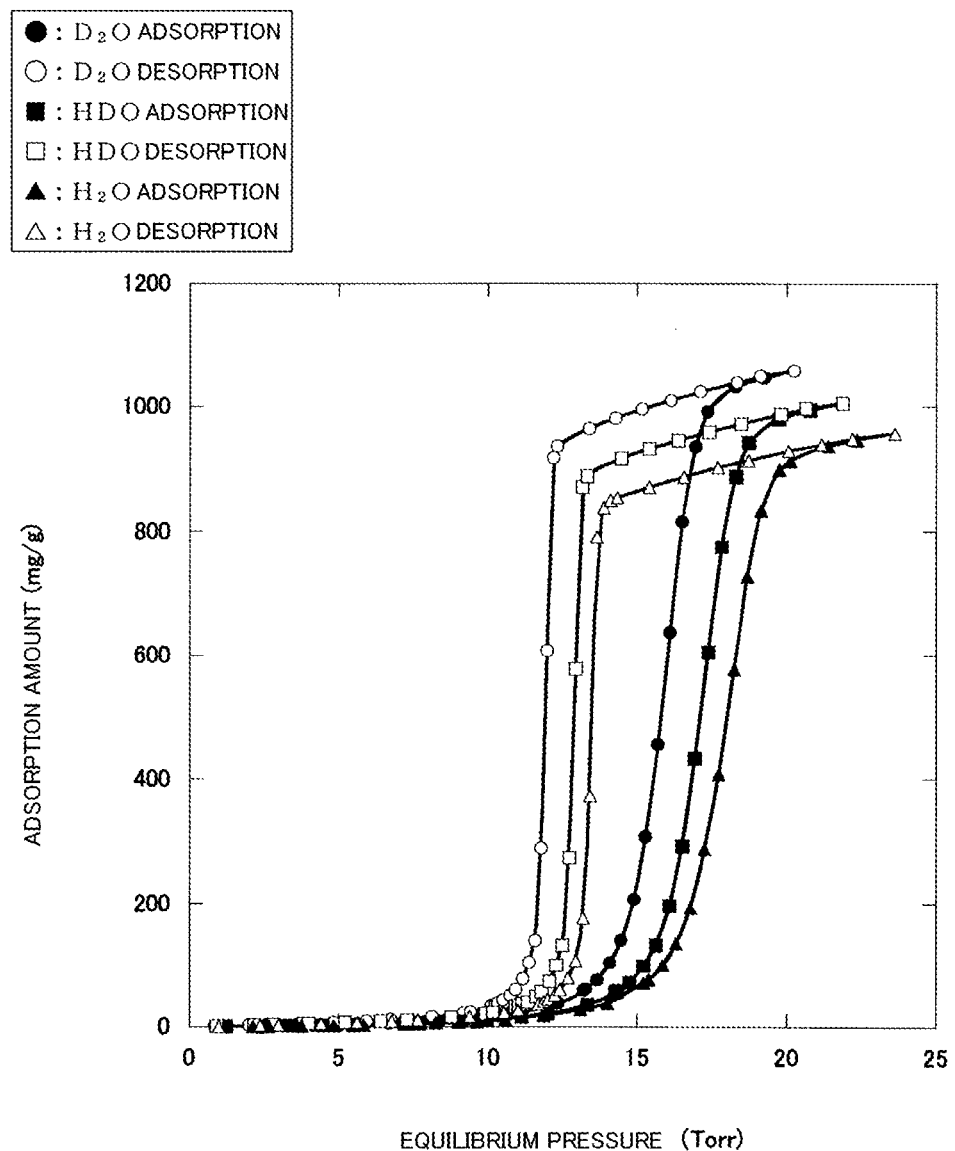
FIG. 1 illustrates water vapor adsorption isotherms of heavy water, semi-heavy water, and light water with respect to activated carbon at 25° C.

FIG. 1 is a graph illustrating a water vapor adsorption isotherm of each of heavy water, semi-heavy water, and light water at 25° C. when activated carbon (activated carbon fiber "A-20" manufactured by AD'ALL Co., Ltd.) is used as an adsorbent.

As illustrated in FIG. 1, the adsorption amount of each of heavy water, semi-heavy water, and light water by activated carbon is largely changed by a small change in pressure. In addition, each of heavy water, semi-heavy water, and light water exhibits hysteresis at adsorption by activated carbon and desorption therefrom.

When a pressure of water vapor is increased from a low pressure and the water vapor is adsorbed by activated carbon, a large amount of heavy water is adsorbed by the activated carbon at 14 to 17 Torr, a large amount of semi-heavy water is adsorbed by the activated carbon at 15 to 18 Torr, and a large amount of light water is adsorbed by the activated carbon at 16 to 19 Torr.

The water vapor is sufficiently adsorbed by the activated carbon, and then the water vapor is desorbed from the activated carbon by reducing the pressure of the water vapor from the high pressure. At this time, a large amount of light water is desorbed from the activated carbon at 14 to 13 Torr, a large amount of semi-heavy water is desorbed from the activated carbon at 13 to 12 Torr, and a large amount of heavy water is desorbed from the activated carbon at 12 to 11 Torr.

First Embodiment

A first embodiment is characterized by preparing activated carbon and supplying water vapor at pressure at which heavy water and semi-heavy water are adsorbed and light water is not easily adsorbed.

A separation apparatus used in the first embodiment includes a vaporizer 1 for converting water into water vapor and supplying the water vapor.

A pipe extending from the vaporizer 1 is connected to an adsorption tank 2.

An adsorbent formed of activated carbon is disposed in the adsorption tank 2.

A liquefier 3 for converting water vapor back into water is disposed downstream of the adsorption tank 2.

A shut-off valve 4 is disposed in the middle of a pipe connecting the adsorption tank 2 to the liquefier 3.

The pipe connecting the adsorption tank 2 to the liquefier 3 is branched in the middle, and can discharge water vapor through a shut-off valve 5.

Figure 2:
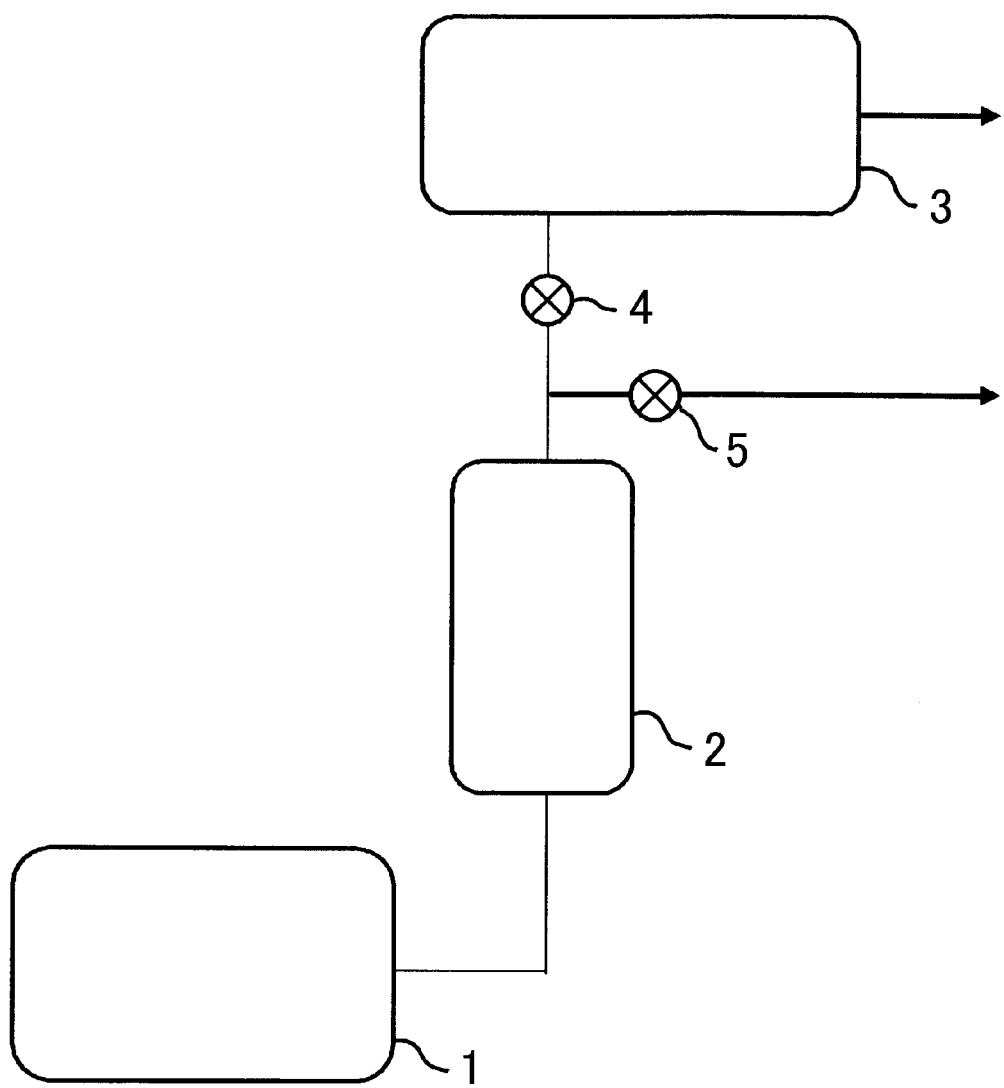
FIG. 2 is a diagram illustrating a separation apparatus according to first and second embodiments of the present invention.

In the separation apparatus illustrated in FIG. 2, when water is first vaporized by the vaporizer 1 and the water vapor flows in the adsorption tank 2 at 25° C. at 16 Torr, heavy water is adsorbed by the adsorbent in an amount of about five times light water. Therefore, by opening the shut-off valve 4 while water vapor is continuously supplied, sequentially converting the water vapor remaining without being adsorbed back into water by the liquefier 3, and recovering the water, deuterium-depleted water having the concentration of deuterium reduced can be obtained.

When the adsorption amounts of heavy water and semi-heavy water by the adsorbent become large, the shut-off valve 4 is closed and the shut-off valve 5 is opened, and the heavy water and semi-heavy water are desorbed from the adsorbent, and are discharged.

Figure 3:
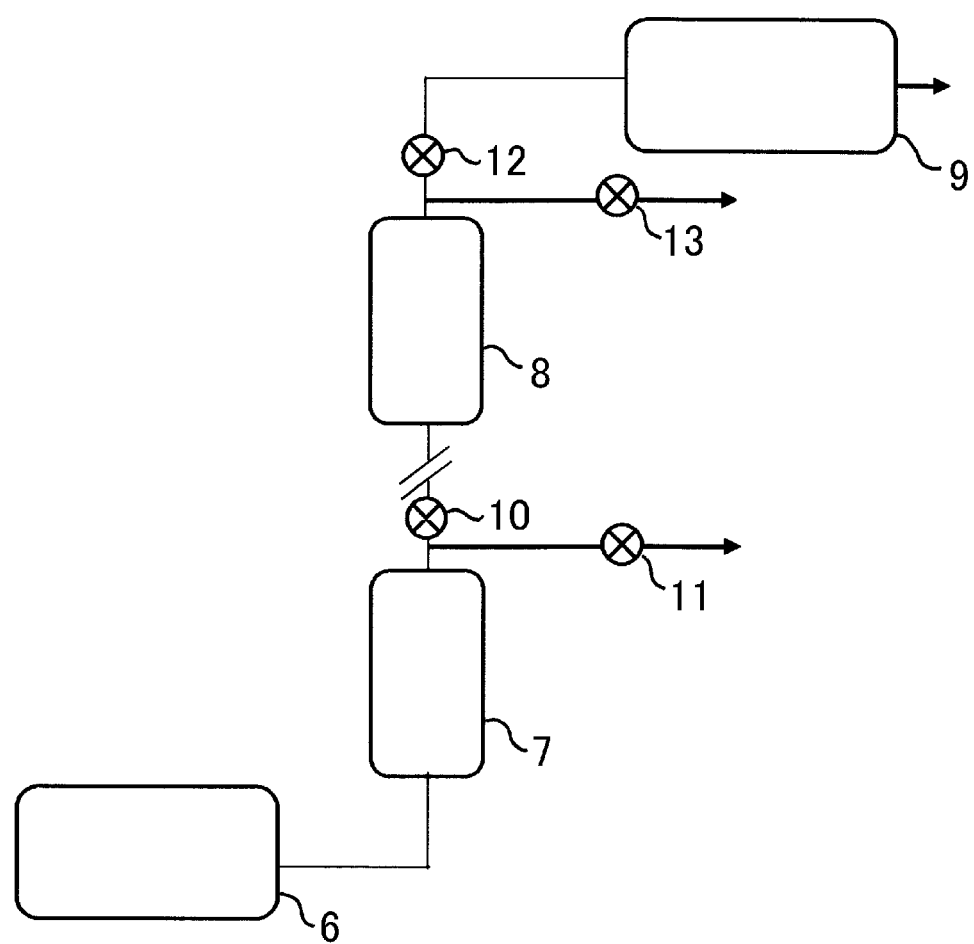
FIG. 3 is a diagram illustrating another separation apparatus according to the first embodiment.
Figure 4:
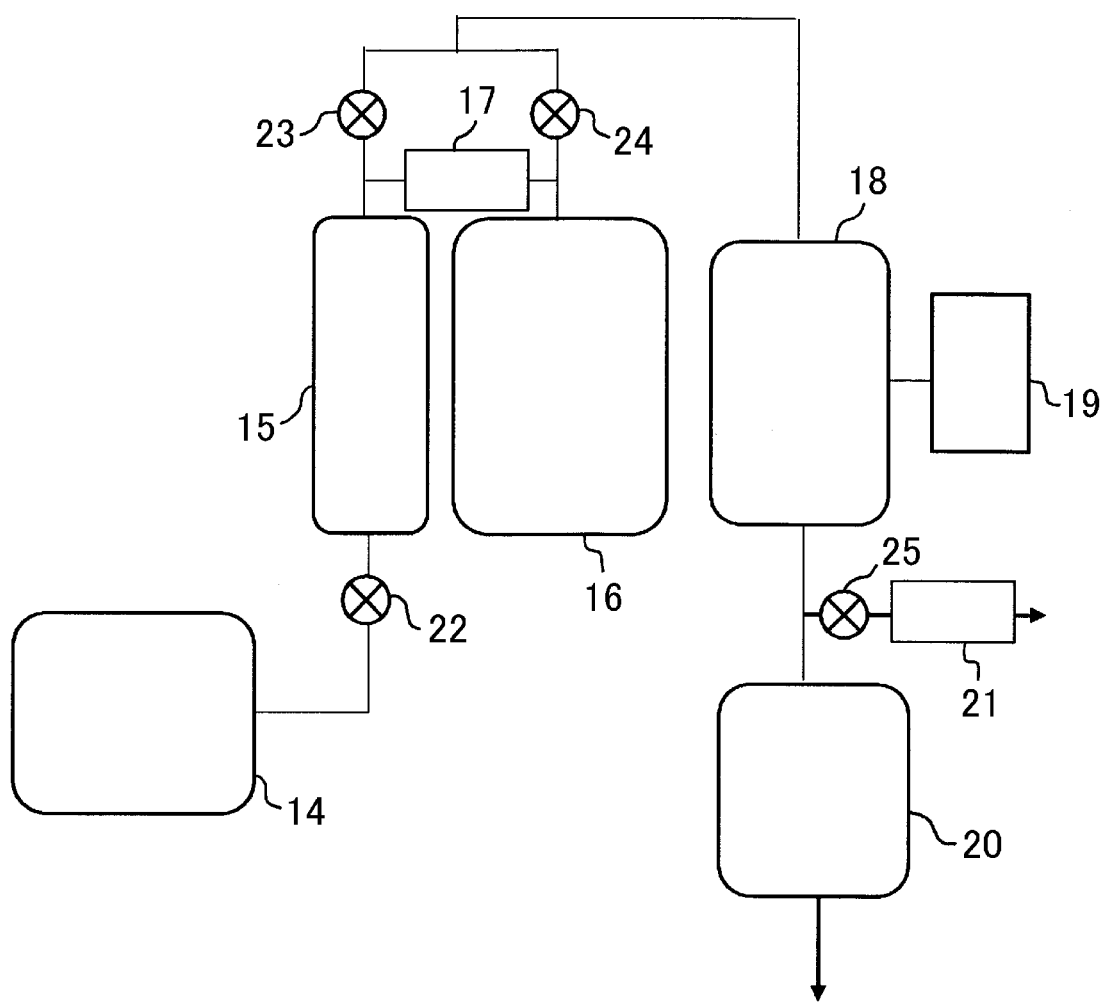
FIG. 4 is a diagram illustrating a separation apparatus according to a third embodiment of the present invention.
Figure 5:
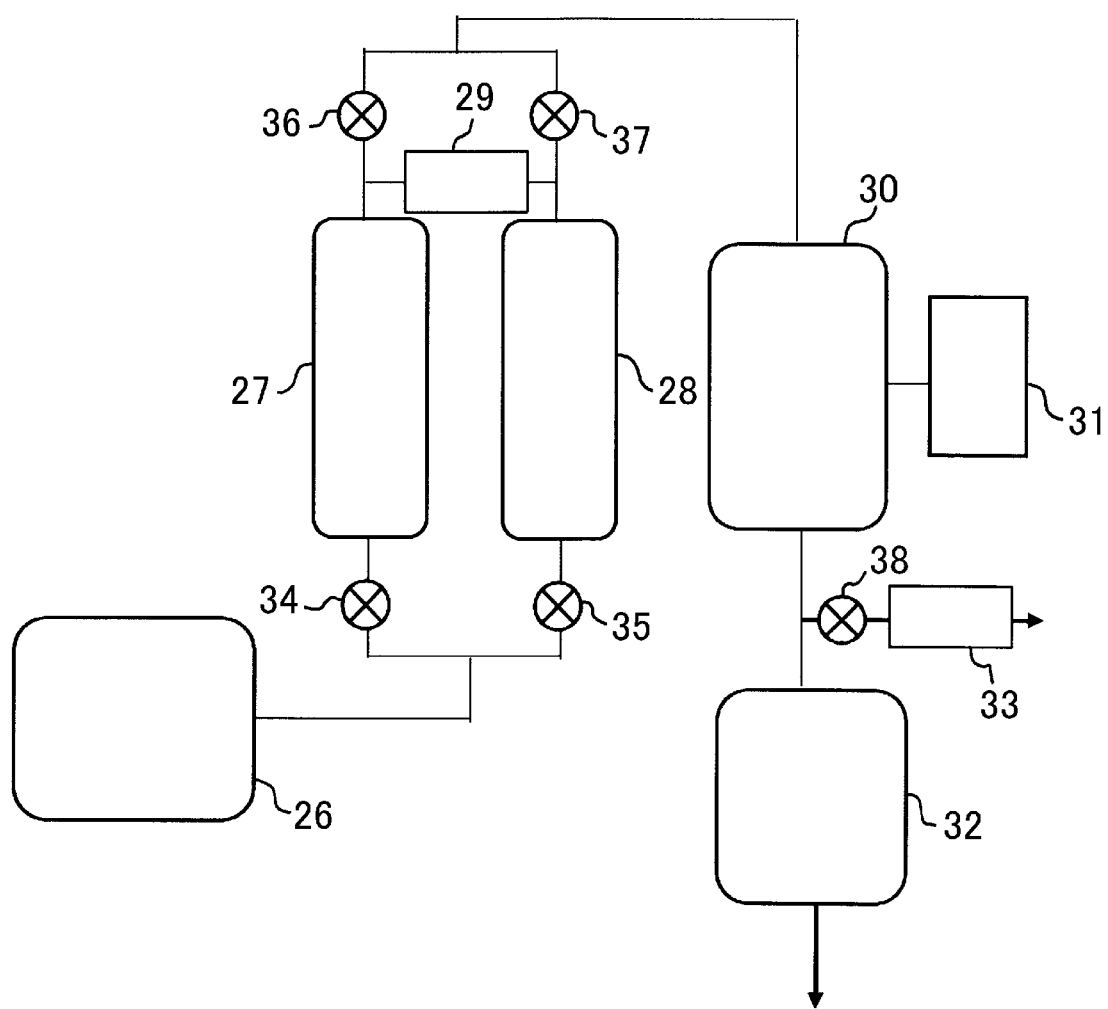
FIG. 5 is a diagram illustrating a separation apparatus according to a fourth embodiment of the present invention.

As illustrated in FIG. 3, a separation apparatus provided with a plurality of adsorption tanks 7 and 8 can be also used.

In this separation apparatus, a first adsorption tank 7 is disposed downstream of a vaporizer 6, and a second adsorption tank 8 is disposed downstream of the first adsorption tank 7.

A shut-off valve 10 is disposed in the middle of a pipe connecting the first adsorption tank 7 to the second adsorption tank 8.

The pipe connecting the first adsorption tank 7 to the second adsorption tank 8 is branched in the middle, and can discharge water vapor through a shut-off valve 11.

A shut-off valve 12 is disposed in the middle of a pipe connecting the second adsorption tank 8 to a liquefier 9.

The pipe connecting the second adsorption tank 8 to the liquefier 9 is branched in the middle, and can discharge water vapor through a shut-off valve 13.

In the separation apparatus in FIG. 3, when water is first vaporized by the vaporizer 6 and the water vapor flows in the first adsorption tank 7 at 25° C. at 16 Torr, heavy water is adsorbed by a first adsorbent in an amount of about five times light water.

When the shut-off valves 10 and 12 are opened in advance and water vapor sequentially flows from the first adsorption tank 7 to the second adsorption tank 8, heavy water is adsorbed also by a second adsorbent in an amount of about five times light water.

Therefore, by sequentially converting the water vapor remaining without being adsorbed back into water by the liquefier 9 while water vapor is continuously supplied, and recovering the water, deuterium-depleted water having the concentration of deuterium further reduced can be obtained.

When the adsorption amounts of heavy water and semi-heavy water by the first and second adsorbents become large, the shut-off valves 10 and 12 are closed and the shut-off valves 11 and 13 are opened, and the heavy water and semi-heavy water are desorbed from the first and second adsorbents, and are discharged.

Second Embodiment

A second embodiment is characterized by preparing an activated carbon which has sufficiently adsorbed water vapor, and maintaining air pressure therearound to pressure at which light water is desorbed and heavy water or semi-heavy water is not desorbed easily.

The second embodiment uses the separation apparatus illustrated in FIG. 2 similarly to the first embodiment.

In the second embodiment, first, water is vaporized by a vaporizer 1 and is supplied to an adsorption tank 2, water vapor is sufficiently adsorbed by an adsorbent, for example, at vapor pressure of 20 Torr or higher at 25° C., and then the pressure is reduced to 13 Torr. At this time, a large amount of light water is desorbed. Subsequently, by opening a shut-off valve 4, converting the desorbed water vapor back into water by a liquefier 3, and recovering the water, deuterium-depleted water having the concentration of deuterium reduced can be obtained.

In adsorption isotherms of heavy water, semi-heavy water, and light water in FIG. 1, an inclination of desorption is sharper than an inclination of adsorption, and the adsorption amount is changed more largely by a small change in pressure. Therefore, in the second embodiment, more reduction in the concentration of deuterium can be expected than in the first embodiment.

An adsorption/desorption speed of light water is faster than that of each of heavy water and semi-heavy water. Therefore, in the second embodiment, by recovering water vapor desorbed before desorption of heavy water, semi-heavy water, and light water becomes a balancing (saturated) state to be stabilized after the pressure is reduced to 13 Torr, deuterium-depleted water having a lower deuterium concentration can be obtained.

Third Embodiment

A third embodiment is characterized by repeating the desorption step in the second embodiment.

A separation apparatus in the third embodiment includes a vaporizer 14 for converting water into water vapor and supplying the water vapor.

A pipe extending from the vaporizer 14 is connected to an adsorption tank 15.

A shut-off valve 22 is disposed in the middle of the pipe.

An adsorbent formed of activated carbon is disposed in the adsorption tank 15.

The adsorption tank 15 is connected to a first gas tank 16 through a predetermined pipe, and a pump 17 is disposed in the pipe. The pump 17 can cause water vapor to come and go between the adsorption tank 15 and the first gas tank 16.

Shut-off valves 23 and 24 are disposed in pipes extending downstream from the adsorption tank 15 and the first gas tank 16, respectively. The pipes are merged into one pipe downstream thereof to be connected to a second gas tank 18.

An analyzer 19 for analyzing a ratio among heavy water, semi-heavy water, and light water in water vapor is disposed in the second gas tank 18.

A liquefier 20 for converting water vapor back into water is disposed downstream of the second gas tank 18.

The pipe connecting the second gas tank 18 to the liquefier 20 is separated in the middle, and can discharge water vapor through a shut-off valve 25 and a pump 21.

In the third embodiment, first, water vapor is supplied from the vaporizer 14 to the adsorption tank 15 at 25° C. at 20 Torr or higher, and water vapor is adsorbed by the adsorbent in a saturated state.

Subsequently, the water vapor in the adsorption tank 15 is supplied to the first gas tank 16 by the pump 17, and the pressure of the adsorption tank 15 is reduced to 13 to 14 Torr to perform the desorption step in the second embodiment.

Thereafter, the water vapor in the first gas tank 16 is returned to the adsorption tank 15 by the pump 17, and is adsorbed by the adsorbent in a saturated state by increasing the pressure to 20 Torr or higher.

Thereafter, the saturated adsorption and the desorption step are repeated alternately, then the shut-off valves 23 and 24 are opened, and the water vapor is supplied to the second gas tank 18 to analyze the water vapor by the analyzer 19.

A concentration of each of heavy water and semi-heavy water in the water vapor is measured by the analyzer 19. When the concentration is higher than a desired concentration, the water vapor is returned to the adsorption tank 15, and the desorption step is repeated again.

When it is confirmed that the concentration of each of heavy water and semi-heavy water is equal to or less than the desired concentration, the water vapor is supplied to a liquefier to be liquefied, and deuterium-depleted water can be thereby obtained.

Thereafter, the shut-off valves 23, 24, and 25 are opened, and the heavy water and the semi-heavy water are desorbed from the adsorbent by the pump 21, and are discharged.

By repeating the desorption step in the second embodiment a plurality of times in this way, the concentration of each of heavy water and semi-heavy water is increased in water vapor adsorbed by the adsorbent, and the concentration of each of heavy water and semi-heavy water is reduced in water vapor recovered. Therefore, deuterium-depleted water having a lower concentration of deuterium can be obtained.

Fourth Embodiment

A fourth embodiment uses a separation apparatus including two adsorption tanks 27 and 28 each incorporating an adsorbent.

This separation apparatus includes a vaporizer 26 for converting water into water vapor and supplying the water vapor.

A pipe extending from the vaporizer 26 is branched into two pipes in the middle, and the two pipes are connected to a first adsorption tank 27 and a second adsorption tank 28, respectively.

From the branch point of the pipe to the first adsorption tank 27 and the second adsorption tank 28, the shut-off valves 34 and 35 are disposed, respectively.

A first adsorbent formed of activated carbon is disposed in the first adsorption tank 27, and a second adsorbent formed of activated carbon is disposed in the second adsorption tank 28.

The first adsorption tank 27 and the second adsorption tank 28 are connected via a predetermined pipe, and a pump 29 is disposed in the pipe. The pump 29 can cause water vapor to come and go between the first adsorption tank 27 and the second adsorption tank 28.

Shut-off valves 36 and 37 are disposed in pipes extending downstream from the first adsorption tank 27 and the second adsorption tank 28, respectively. The pipes are merged into one pipe downstream thereof to be connected to a gas tank 30.

An analyzer 31 for analyzing a ratio among heavy water, semi-heavy water, and light water in water vapor is disposed in the gas tank 30.

A liquefier 32 for converting water vapor back into water is disposed downstream of the gas tank 30.

The pipe connecting the gas tank 30 to the liquefier 32 is branched in the middle, and can discharge water vapor through a shut-off valve 38 and a pump 33.

In order to produce deuterium-depleted water with this separation apparatus, first, the shut-off valve 34 is opened, water vapor is supplied from the vaporizer 26 to the first adsorption tank 27 at 25° C. at 20 Torr or higher, and water vapor is adsorbed by the first adsorbent in a saturated state.

Subsequently, the water vapor in the first adsorption tank 27 is supplied to the second adsorption tank 28 by the pump 29, and the pressure of the first adsorption tank 27 is reduced to 13 to 14 Torr to perform the desorption step in the second embodiment. Simultaneously, the pressure of the water vapor in the second adsorption tank 28 is increased to 20 Torr or higher, and saturated adsorption is performed (first step).

Subsequently, the water vapor in the second adsorption tank 28 is supplied to the first adsorption tank 27 by the pump 29, and the pressure of the second adsorption tank 28 is reduced to 13 to 14 Torr to perform the desorption step in the second embodiment. Simultaneously, the pressure of the water vapor in the first adsorption tank 27 is increased to 20 Torr or higher, and saturated adsorption is performed (second step).

After the first step and the second step are alternately repeated a plurality of times, the water vapor recovered by opening the shut-off valves 36 and 37 is led to the gas tank 30.

A concentration of each of heavy water and semi-heavy water in the water vapor is measured by the analyzer 31. When the concentration is higher than a desired concentration, the water vapor is returned to the first adsorption tank 27 and the second adsorption tank 28, and the first step and the second step are repeated again.

When it is confirmed that the concentration of each of heavy water and semi-heavy water is equal to or less than the desired concentration, the water vapor is supplied to the liquefier 32 to be liquefied, and deuterium-depleted water can be thereby obtained.

Thereafter, the shut-off valves 36, 37, and 38 are opened, and the water vapor adsorbed by the first and second adsorbents is desorbed by the pump 33, and is discharged.

In the fourth embodiment, by causing water vapor to come and go between the first adsorption tank 27 and the second adsorption tank 28, a desorption step can be performed in one of the tanks, saturated adsorption can be performed in the other tank simultaneously, the amount of each of heavy water and semi-heavy water in the water vapor can be reduced efficiently, and deuterium-depleted water can be produced easily.

The concentration of each of heavy water and semi-heavy water in water vapor is measured by the analyzer 31 provided in the gas tank 30. When the concentration is higher than a desired concentration, the water vapor can be returned to the first adsorption tank 27 and the second adsorption tank 28, and it is possible to produce deuterium-depleted water obtained by liquefying water vapor having heavy water and semi-heavy water sufficiently reduced.

In the first to fourth embodiments, water containing a large amount of heavy water and semi-heavy water remaining in the adsorbent is discarded. However, this water can be recovered to be used in an application requiring heavy water and semi-heavy water.

REFERENCE SIGNS LIST

1, 6, 14, 26 vaporizer
2, 7, 8, 15, 27, 28 adsorption tank
3, 9, 20, 32 liquefier
17, 21, 29, 33 pump
16, 18, 30 gas tank
19, 31 analyzer
4, 5, 10, 11, 12, 13, 22, 23, 24, 25, 34, 35, 36, 37, 38 shut-off valve

The invention claimed is:

1. A method for producing deuterium-depleted water by removing heavy water and semi-heavy water from water, comprising:
an adsorption step of supplying water vapor to a predetermined adsorbent at pressure at which heavy water and semi-heavy water are adsorbed by the adsorbent and light water is not easily adsorbed, causing the heavy water and the semi-heavy water to be adsorbed, and recovering the water vapor not adsorbed by the adsorbent, wherein
the pressure for supplying the water vapor in the adsorption step is a low pressure which is equal to or lower than a pressure having a maximum inclination of an adsorption isotherm of light water in the adsorbent.

2. A method for producing deuterium-depleted water by removing heavy water and semi-heavy water from water, comprising:
a desorption step of maintaining air pressure around a predetermined adsorbent which has adsorbed water vapor in a range in which light water is desorbed and heavy water or semi-heavy water is not easily desorbed, and recovering the water vapor desorbed from the adsorbent.

3. A method for producing deuterium-depleted water by removing heavy water and semi-heavy water from water, comprising:
at least one step of supplying water vapor to a predetermined adsorbent for adsorption; and
at least one desorption step of maintaining air pressure around the adsorbent in a range in which light water is desorbed and heavy water or semi-heavy water is not easily desorbed, and recovering the water vapor desorbed from the adsorbent.

4. A method for producing deuterium-depleted water by removing heavy water and semi-heavy water from water, comprising:
at least one first step of maintaining air pressure around a predetermined first adsorbent which has adsorbed water vapor in a first adsorption tank in a range in which light water is desorbed and heavy water or semi-heavy water is not easily desorbed, recovering the water vapor desorbed from the first adsorbent, and supplying the water vapor recovered in the first adsorption tank to a predetermined second adsorbent in a second adsorption tank for adsorption; and
at least one second step of maintaining air pressure around the second adsorbent which has adsorbed the water vapor in the second adsorption tank in a range in which light water is desorbed and heavy water or semi-heavy water is not easily desorbed, recovering the water vapor desorbed from the second adsorbent, and supplying the water vapor recovered in the second adsorption tank to the first adsorbent in the first adsorption tank for adsorption.

5. The method for producing deuterium-depleted water according to claim 1, wherein the adsorbent is formed of a material classified into type IV or V in the IUPAC classification for a water vapor adsorption isotherm.

6. A method for separating water into light water, and heavy water and semi-heavy water, comprising:
   an adsorption step of supplying water vapor to a predetermined adsorbent at pressure at which heavy water and semi-heavy water are adsorbed by the adsorbent and light water is not easily adsorbed, and causing the heavy water and the semi-heavy water to be adsorbed, wherein
   the pressure for supplying the water vapor in the adsorption step is a low pressure which is equal to or lower than a pressure having a maximum inclination of an adsorption isotherm of light water in the adsorbent.

7. A method for separating water into light water, and heavy water and semi-heavy water, comprising:
   maintaining air pressure around a predetermined adsorbent which has adsorbed water vapor in a range in which light water is desorbed and heavy water or semi-heavy water is not easily desorbed, and desorbing the water vapor from the adsorbent.

8. A method for producing deuterium-enriched water by removing light water from water, comprising:
   an adsorption step of supplying water vapor to a predetermined adsorbent at pressure at which heavy water and semi-heavy water are adsorbed by the adsorbent and light water is not easily adsorbed, causing the heavy water and the semi-heavy water to be adsorbed, and recovering the water adsorbed by the adsorbent, wherein
   the pressure for supplying the water vapor in the adsorption step is a low pressure which is equal to or lower than a pressure having a maximum inclination of an adsorption isotherm of light water in the adsorbent.

9. A method for producing deuterium-enriched water by removing light water from water, comprising:
   a desorption step of maintaining air pressure around a predetermined adsorbent which has adsorbed water vapor in a range in which light water is desorbed and heavy water or semi-heavy water is not easily desorbed, and desorbing the water vapor from the adsorbent; and then recovering the water remaining in the adsorbent.

10. The method for producing deuterium-depleted water according to claim 2, wherein the adsorbent is formed of a material classified into type IV or V in the IUPAC classification for a water vapor adsorption isotherm.

11. The method for producing deuterium-depleted water according to claim 3, wherein the adsorbent is formed of a material classified into type IV or V in the IUPAC classification for a water vapor adsorption isotherm.

12. The method for producing deuterium-depleted water according to claim 4, wherein the adsorbent is formed of a material classified into type IV or V in the IUPAC classification for a water vapor adsorption isotherm.

* * * * *